US009753357B2

(12) United States Patent
Carey et al.

(10) Patent No.: US 9,753,357 B2
(45) Date of Patent: Sep. 5, 2017

(54) COMPACT SOLID-STATE CAMERA FLASH

(71) Applicant: Intematix Corporation, Fremont, CA (US)

(72) Inventors: Julian Carey, San Francisco, CA (US); Mark Swoboda, Pleasanton, CA (US); Michael Jansen, Palo Alto, CA (US)

(73) Assignee: Intematix Corporation, Fremont, CA (US)

(*) Notice: Subject to any disclaimer, the term of this patent is extended or adjusted under 35 U.S.C. 154(b) by 53 days.

(21) Appl. No.: 14/633,048

(22) Filed: Feb. 26, 2015

(65) Prior Publication Data

US 2015/0241758 A1 Aug. 27, 2015

Related U.S. Application Data

(60) Provisional application No. 61/945,479, filed on Feb. 27, 2014.

(51) Int. Cl.
*G03B 15/02* (2006.01)
*G03B 15/05* (2006.01)

(52) U.S. Cl.
CPC ...... *G03B 15/05* (2013.01); *G03B 2215/0567* (2013.01); *G03B 2215/0582* (2013.01)

(58) Field of Classification Search
CPC ............ G03B 15/05; G03B 2215/0567; G03B 2215/0582
USPC .......................................................... 362/16
See application file for complete search history.

(56) References Cited

U.S. PATENT DOCUMENTS

| | | |
|---|---|---|
| 7,311,858 B2 | 12/2007 | Wang et al. |
| 7,390,437 B2 | 6/2008 | Dong et al. |
| 7,541,728 B2 | 6/2009 | Wang et al. |
| 7,575,697 B2 | 8/2009 | Li et al. |
| 7,601,276 B2 | 10/2009 | Li et al. |
| 7,655,156 B2 | 2/2010 | Cheng et al. |
| 7,755,276 B2 | 7/2010 | Wang et al. |
| 8,133,461 B2 | 3/2012 | Tao et al. |
| 8,274,215 B2 | 9/2012 | Liu et al. |
| 8,414,796 B2 | 4/2013 | Tao et al. |
| 8,475,683 B2 | 7/2013 | Li et al. |
| 8,529,791 B2 | 9/2013 | Wu et al. |
| 8,597,545 B1 | 12/2013 | Liu et al. |
| 2005/0147137 A1* | 7/2005 | Slatkine ............... A61B 18/20 372/30 |
| 2009/0283721 A1 | 11/2009 | Liu et al. |

(Continued)

*Primary Examiner* — Ali Alavi
(74) *Attorney, Agent, or Firm* — Vista IP Law Group, LLP

(57) ABSTRACT

A camera flash comprises a solid-state light source (laser chip) operable to emit excitation light having an emission peak wavelength in a first wavelength range and a photoluminescence wavelength conversion component located remote to the light source. The photoluminescence wavelength conversion component comprises at least one photoluminescence material (phosphor) that is excitable by the excitation light and in response emits light having an emission peak wavelength in a second wavelength range. The light source is configured such that excitation light is incident on an area of the photoluminescence wavelength conversion component less than about 0.01 $mm^2$. The photoluminescence wavelength conversion component can comprise a light reflective or light transmissive component.

21 Claims, 6 Drawing Sheets

(56) References Cited

U.S. PATENT DOCUMENTS

| | | | |
|---|---|---|---|
| 2010/0176751 A1* | 7/2010 | Oshio | H01L 33/62 315/362 |
| 2013/0140491 A1 | 6/2013 | Li et al. | |
| 2013/0168605 A1 | 7/2013 | Li et al. | |
| 2013/0188376 A1* | 7/2013 | En | F21V 21/34 362/510 |
| 2013/0214676 A1* | 8/2013 | Li | H05B 33/12 313/512 |
| 2013/0234586 A1 | 9/2013 | Liu et al. | |
| 2015/0002824 A1* | 1/2015 | Kasugai | G03B 21/204 353/31 |
| 2015/0233550 A1* | 8/2015 | Wu | F21V 14/08 353/84 |

\* cited by examiner

COMPACT SOLID-STATE CAMERA FLASH

CROSS-REFERENCE TO RELATED APPLICATION

This application claims the benefit of priority to U.S. Application No. 61/945,479, filed on Feb. 27, 2014, which is hereby incorporated by reference in its entirety.

FIELD

This invention relates to a solid-state camera flash and more especially to camera flashes that utilize one or more photoluminescence materials to generate a selected color of flash light. More particularly, though not exclusively, embodiments of the invention concern compact camera flashes for use in ultra thin devices such as cell phones, smart phones and tablet computers.

BACKGROUND

Electronic camera flashes have traditionally been based on arc lamps typically a xenon flash tube. However, such flash tubes are too bulky for today's ultra thin cell phones, smart phones, tablet computers and other ultra thin devices. A majority of smart phones now come equipped with a digital camera and increasingly many additionally include a flash unit to enable picture tacking in low light conditions. In such devices the flash unit comprises a white light emitting Light Emitting Diode ("white LED"). Typically white LEDs are based on LED chips that emit in the blue or ultraviolet part of the electromagnetic spectrum and include one or more photoluminescence materials (e.g., phosphor materials), which absorb a portion of the light emitted by the LED and through a process of photoluminescence re-emit light of a different color (wavelength). The LED chip generates blue light and the phosphor(s) re-emits, for example, yellow light or a combination of green and red light, green and yellow light, green and orange or yellow and red light. The portion of the blue light generated by the LED that is not absorbed by the phosphor material combined with the light emitted by the phosphor provides light which appears to the eye as being nearly white in color. Typically the phosphor material is mixed with a liquid light transmissive material, such as silicone or epoxy material, and the mixture applied to the light emitting surface of the LED chip. It is the phosphor material that gives rise to the characteristic yellow to orange appearance of the flash unit in an off-state. Whilst white LED based flash units are compact it is desirable if they were capable of generating a flash with a greater range. Embodiments of the invention, at least in part, address this problem.

SUMMARY OF THE INVENTION

Some embodiments of the invention concern a camera flash comprising a solid-state light source to generate excitation light which is used to excite a remotely located photoluminescence wavelength conversion component containing one or more photoluminescence materials, typically phosphors. In this patent specification "remote", "remotely" indicate a spaced or separated relationship. Typically the light source and photoluminescence wavelength conversion component are separated by an air gap though it is contemplated in other embodiments that gap be filled with a light transmissive optical medium. The solid-state light source, which typically comprises a laser chip, is configured such that excitation light is incident on an area of the photoluminescence wavelength conversion component of less than about 0.01 mm$^2$. The effective source size at the photoluminescence wavelength conversion component is approximately 200% of the incident excitation light area resulting in a source size of about 0.02 mm$^2$ or smaller. Since the camera flash of the invention has a very small source size, and consequently low etendue, compared with the known white LED-based flash units, this enables use of a lens or other optic to gather more light and direct it in a direction to increase the range of the camera flash. To achieve an incident excitation light area at the photoluminescence wavelength conversion component of less than 0.01 mm$^2$, the light source can comprise a laser chip (typically a laser diode).

According to one embodiment, a camera flash comprises a solid-state light source operable to emit excitation light having an emission peak wavelength in a first wavelength range and a photoluminescence wavelength conversion component located remote to the solid-state light source, said photoluminescence wavelength conversion component comprising at least one photoluminescence material that is excitable by said excitation light and in response emits light having an emission peak wavelength in a second wavelength range; wherein the solid-state light source is configured such that excitation light is incident on an area of the photoluminescence wavelength conversion component less than about 0.01 mm$^2$. To minimize the effective source size of the camera flash, the excitation light is incident on as small an area of the photoluminescence wavelength conversion component as possible. In some embodiments the excitation light is incident on an area less than about 0.005 mm$^2$ and preferably incident on an area of between about 0.0003 mm$^2$ and about 0.002 mm$^2$. Preferably the excitation light incident on the photoluminescence wavelength conversion component is substantially circular in form and of diameter about 20 μm to about 50 μm.

In some embodiments the photoluminescence wavelength conversion component comprises a light reflective component comprising a light reflective substrate with the at least one photoluminescence material comprising at least one layer on a light reflective surface of the light reflective substrate. To aid in the dissipation of heat and reduce potential thermal degradation of the photoluminescence material(s) the light reflective substrate is advantageously additionally thermally conductive. The light reflective substrate can comprise a metal such as aluminum or copper or a thermally conductive ceramic such as aluminum oxide, or aluminum nitride. To further aid in the dissipation of heat, the photoluminescence wavelength conversion component is advantageously mounted in thermal communication with a thermally conductive substrate on which the light source is mounted.

In other embodiments the photoluminescence wavelength conversion component comprises a light transmissive component. In such embodiments the component comprises a light transmissive substrate with the at least one photoluminescence material being a) provided as at least one layer on a surface of the light transmissive substrate or b) incorporated within and substantially homogeneously distributed throughout the light transmissive substrate. To aid in the dissipation of heat and reduce possible thermal degradation of the photoluminescence material(s) the light transmissive substrate can not only be light transmissive but is advantageously additionally thermally conductive. Suitable light transmissive thermally conductive materials include magnesium oxide, sapphire, aluminum oxide, quartz glass, aluminum nitride or diamond. To further aid in the dissipation of heat, at least a part of the light transmissive thermally conductive substrate of the photoluminescence wavelength conversion component is advantageously mounted in thermal communication with a thermally conductive housing of the camera flash.

To dissipate heat generated during operation of the camera flash, the flash can further comprise a thermally conductive substrate on which the light source is mounted in thermal communication with a surface thereof. Additionally the photoluminescence wavelength conversion component is advantageously mounted in thermal communication with the thermally conductive substrate to reduce a likelihood of thermal degradation of the photoluminescence material(s). The thermally conductive substrate preferably comprises: aluminum oxide, aluminum nitride and aluminum. In other embodiments the substrate can comprise a thermally conductive circuit board such as a MCPCB (metal core printed circuit board) or like structure.

To direct excitation light generated by the light source onto the photoluminescence wavelength conversion component, the camera flash can further comprise a lens or other optical component disposed between the light source and the photoluminescence wavelength conversion component.

Since the photoluminescence process is isotropic, half of the photoluminescence generated light will be emitted in a direction back towards the light source. To reduce such light being absorbed by the light source, the camera flash can further comprise a wavelength selective component disposed between the light source and the photoluminescence wavelength conversion component. The wavelength selective component can have an optical property of being substantially transmissive to the excitation light and being substantially reflective to light generated by the photoluminescence material(s). The wavelength selective component can comprise a multilayer dielectric filter or dichroic filter.

In some preferred embodiments the light source is operable to generate blue excitation light having an emission peak wavelength in a range 465 nm to 480 nm. In such arrangements the excitation light contributes to the emission product of the camera flash which comprises a combination of light generated by the at least one photoluminescence material and unconverted excitation light. In such arrangements the photoluminescence material generates at least yellow to green light and may additionally generate orange to red to increase the color rendering index (CRI) of the camera flash emission product.

Alternatively, the light source is operable to generate ultra violet (UV) excitation light having an emission peak wavelength in a range 365 nm to 400 nm. In such an arrangement the photoluminescence wavelength conversion component comprises at least two photoluminescence materials which preferably covert all of the excitation light to blue light and yellow to green light. The emission product of such a camera flash comprises a combination of light generated by the at least two photoluminescence materials. To increase the color rendering index (CRI) of the camera flash emission product the wavelength conversion component can further comprise an orange to red emitting photoluminescence material Where the excitation light comprises UV light, the camera flash can further comprise a wavelength selective optical component for preventing the emission of potentially harmful UV light. Such an optical component has an optical property of being substantially transmissive to light generated by the photoluminescence material(s) whilst preventing (blocking) the transmission of excitation light. The optical component can be configured to prevent the transmission of excitation light by absorption of such light or by having an optical characteristic of being substantially reflective light of wavelengths corresponding to the excitation light. The latter arrangement provides a benefit of increasing efficiency of the flash since the reflected excitation light can interact with the photoluminescence wavelength conversion component to generate more photoluminescence light. The optical component can be disposed at an output of the flash. The optical component can comprise a multilayer dielectric filter, dichroic filter or a material, such as glass that absorbs UV light.

In various embodiments of the invention the camera flash is operable to emit light for a duration of up to about 300 ms. Preferably, the emission product of the camera flash comprises white light with a correlated color temperature (CCT) of 4,500 K to 5,000 K. To aid in the accurate rendering of colors, the emission product of the camera flash has a color rendering index (CRI) of greater than about 80 (e.g., from 80 to 100), preferably greater than about 85 (e.g., from 85 to 100), and advantageously greater than about 90 (e.g., from 90 to 100).

BRIEF DESCRIPTION OF THE DRAWINGS

In order that the present invention is better understood solid-state camera flash units in accordance with the invention will now be described, by way of example only, with reference to the accompanying drawings in which.

DETAILED DESCRIPTION OF THE INVENTION

Figure 1:
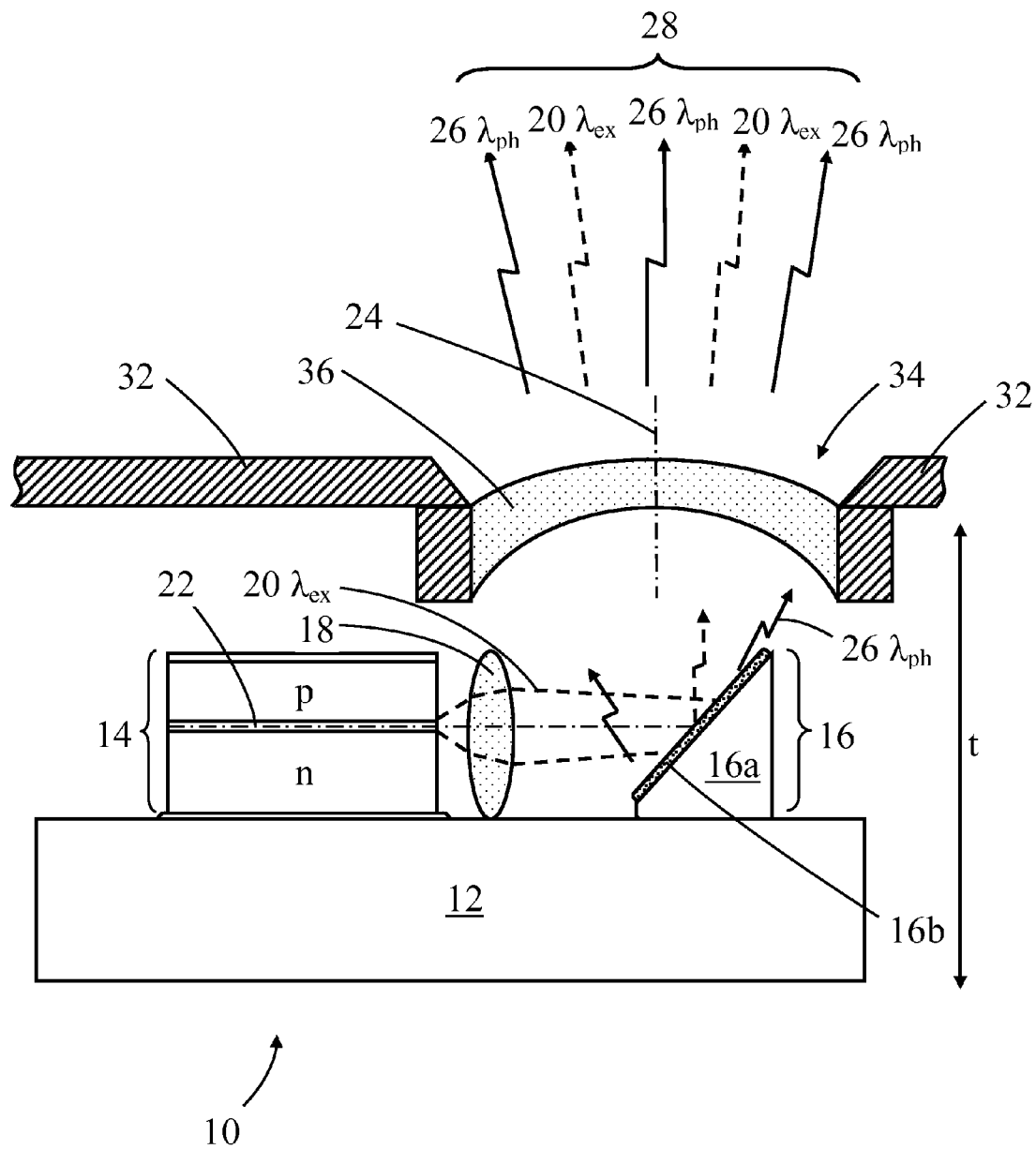
FIGS. 1 and 2 respectively show schematic side and plan views of a solid-state camera flash unit in accordance with an embodiment of the invention.
Figure 2:
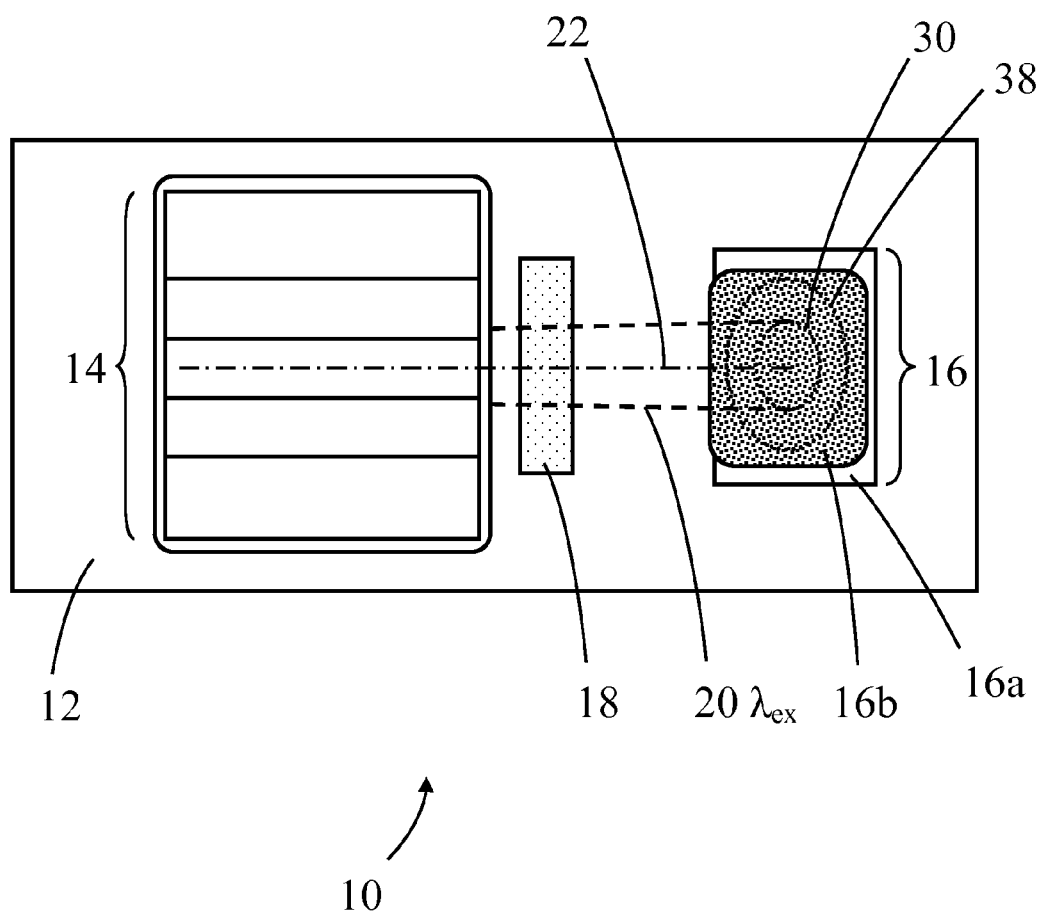

Referring to FIGS. 1 and 2 there are respectively shown schematic side and plan views of a solid-state camera flash unit 10 in accordance with an embodiment of the invention. The flash unit 10 is intended for use in an ultra thin device such as a smart phone or tablet computer which typically has an overall thickness of about 5 mm or less. Whilst the flash units of the present invention arose in relation for use in ultra thin devices it will be appreciated that the benefits of the invention can be realized in other devices such as for example compact cameras. The flash unit 10 is configured to produce a white light flash of duration of about 300 ms or less with a typical CCT of 4,500 K to 5,000 K and a CRI of at least 80. The CRI of the flash, which depends principally on the photoluminescence material(s), is preferably as high as possible and is advantageously greater than about 85 (e.g., from 85 to 100) and more preferably about 90 (e.g., from 90 to 100) or higher.

The flash unit 10 comprises a thermally conductive substrate 12, a solid-state laser chip (light source) 14, a light reflective photoluminescence wavelength conversion component 16 and a lens 18.

The laser chip 14 is operable to generate excitation light 20 $\lambda_{ex}$ which can comprise UV light with a peak emission wavelength of between 365 nm to 400 nm or blue light with a peak emission wavelength of 460 nm to 480 nm. In the case of the former the laser chip 14 can comprise a gallium nitride (GaN) UV light emitting laser diode chip. Alternatively where the excitation light comprises blue light the laser chip can comprise an indium gallium nitride (InGaN) blue light emitting double heterostructure laser diode chip. The laser chip 14 can be a 1 to 3 Watt device that emits light from an end face over a size in a vertical direction (i.e. orthogonal to the plane of the active layer) of about 2 μm and an emission size in a parallel direction (i.e. orthogonal to the vertical direction) of 10 μm to 20 μm. The laser chip 14 emits excitation light 20 in the form of a divergent beam with a divergence of 10° to 20° in a vertical direction and 5° to 10° in a parallel direction.

As indicated in FIG. 1 the thermally conductive substrate 12 can be planar in form and can comprise a thermally conductive ceramic such as aluminum oxide ($Al_2O_3$) or aluminum nitride (AlN). Alternatively the thermally conductive substrate 12 can comprise a metal such as aluminum (Al) or copper (Cu) or any material with a good thermal conductivity (typically ≥150 $Wm^{-1}K^{-1}$ and preferably ≥200 $Wm^{-1}K^{-1}$) such as for example a metal loaded polymer material. The function of the thermally conductive substrate 12 is to dissipate heat generated by the laser chip 14 and in other embodiments the substrate 12 can comprise a MCPCB or like structure. As is known a MCPCB comprises a layered structure composed of a metal core base, typically aluminum, a thermally conducting/electrically insulating dielectric layer and a copper circuit layer for electrically connecting electrical components in a desired circuit configuration.

The laser chip 14 is mounted in thermal communication with a planar surface of the thermally conductive substrate 12 and is configured such that the laser chip emission axis/plane 22 is parallel with the planar surface such that the laser chip emits excitation light 20 in a direction towards the light reflective photoluminescence wavelength conversion component 16. As indicated in FIG. 1 the laser chip emission axis/plane 22 is orthogonal to the flash unit emission axis 24. Such a configuration can be beneficial in minimizing an overall thickness t of the flash unit 10.

The light reflective photoluminescence wavelength conversion component 16 (hereinafter "reflective conversion component") is composed of a light reflective thermally conductive substrate (hereinafter "light reflective substrate") 16a and a photoluminescence material layer 16b containing one or more photoluminescence materials typically phosphors. In the embodiment illustrated the light reflective substrate 16a is in the form of a right triangular prism (i.e. a cylinder with a triangular cross section) in which the photoluminescence material layer 16b is provided on the light reflective planar surface of the substrate 16a that faces the laser chip 14. As indicated the photoluminescence material layer 16b can be inclined to the laser chip emission axis/plane 22 at an angle of about 45°.

The light reflective substrate 16a can comprise a thermally conductive ceramic such as aluminum oxide ($Al_2O_3$) or aluminum nitride (AlN). Alternatively the light reflective substrate 16a can comprise a metal such as aluminum (Al) or any material with a good thermal conductivity. The function of the light reflective substrate 16a is twofold: i) to reflect photoluminescence generated light 26 $\lambda_{ph}$ and unconverted excitation light 20 $\lambda_{ex}$ and ii) to dissipate heat generated by the photoluminescence process and thereby prevent thermal degradation of the photoluminescence material.

The photoluminescence material layer 16b includes one or more photoluminescence materials. The number of photoluminescence materials depends on: i) the wavelength of the excitation light 20 $\lambda_{ex}$ i.e. whether it is UV light or blue light and ii) the required CRI of the emission product (flash) 28 of the flash unit 10. For example where the excitation light 20 $\lambda_{ex}$ comprises blue light (peak wavelength of 465 nm to 480 nm), which contributes to the flash unit's emission product 28, the photoluminescence material typically comprises at least a green to yellow light emitting material. Where it is required for the emission product 28 to have a CRI greater than 80 (e.g., in the range from 80 to 100), the photoluminescence material preferably further includes an orange to red light emitting material. Conversely Where the excitation light 20 $\lambda_{ex}$ comprises UV light (peak wavelength of 365 nm to 400 nm), which does not contribute to the flash unit's final emission product 28, the photoluminescence material further comprises a blue light emitting material.

In some embodiments, the photoluminescence material comprises one or more inorganic phosphor materials. For the purposes of illustration only, the following description is made with reference to photoluminescence materials embodied specifically as phosphor materials. However, the invention is applicable to any type of photoluminescence material including for example organic phosphor materials and quantum dots.

The green to yellow light emitting phosphor can comprise an aluminate-based or garnet-based (YAG-based) phosphor material such as is taught in United States patents U.S. Pat. No. 7,541,728 B2 and U.S. Pat. No. 7,755,276 B2 "Novel aluminate-based green phosphors", U.S. Pat. No. 8,529,791 B2 "Green-emitting, garnet-based phosphors in general and backlighting applications", U.S. Pat. No. 8,475,683 B2 "Yellow-green to yellow-emitting phosphors based on halogenated-aluminates", U.S. Pat. No. 8,133,461 B2 and U.S. Pat. No. 8,414,796 B2 "Nano YAG: Ce phosphor compositions and their methods of preparation", and in co-pending United States patent application US 2013/0140491 A1 "Green to yellow light emitting aluminate phosphors". Alternatively, the green to yellow light emitting phosphor can comprise a silicate-based phosphor of a general composition $A_3Si(O,D)_5$ or $A_2Si(O,D)_4$ in which Si is silicon, O is oxygen, A includes strontium (Sr), barium (Ba), magnesium (Mg) or calcium (Ca) and D includes chlorine (Cl), fluorine (F), nitrogen (N) or sulfur (S). Examples of suitable silicate-based phosphors are disclosed in United States patents U.S. Pat. No. 7,575,697 B2 "Silicate-based green phosphors", U.S. Pat. No. 7,311,858 B2 "Silicate-based yellow-green phosphors" and U.S. Pat. No. 7,601,276 B2 "Two phase silicate-based yellow phosphors". The orange to red light emitting phosphor preferably comprises a nitride-based phosphor material such as is taught in United States patents U.S. Pat. No. 8,597,545 B1 "Red-emitting nitride-based calcium stabilized phosphors" and U.S. Pat. No. 8,274,215 B2 "Nitride-based, red-emitting phosphors" and in co-pending United States patent applications US 2009/0283721 A1 "Nitride-based red phosphors", US 2013/0168605 A1 "Nitride phosphors with interstitial cations for charge balance" and US 2013/0234586 A1 "Nitride-based red-emitting in RGB (red-green-blue) lighting systems". Alternatively and/or in addition the orange to red light emitting phosphor can comprise a silicate phosphor material such as taught for example in U.S. Pat. No. 7,655,156 B2 "Silicate-based orange phosphors". The blue light emitting phosphor can comprise an aluminate-based phosphor such as taught for example in U.S. Pat. No. 7,390,437 B2 "Aluminate-based blue phosphors". The entire content of each of the above referenced patents and patent applications are hereby incorporated by way of reference thereto.

It will be appreciated that the phosphor materials are not limited to the examples described and can include any phosphor material including for example sulfate phosphor materials, oxy-nitrides and oxy-sulfate phosphors.

A quantum dot is a portion of matter (e.g., semiconductor) whose excitons are confined in all three spatial dimensions that may be excited by radiation energy to emit light of a particular wavelength or range of wavelengths. Quantum dots can comprise different materials, for example cadmium selenide (CdSe). The color of light generated by a quantum dot is enabled by the quantum confinement effect associated with the nano-crystal structure of the quantum dots. The energy level of each quantum dot relates directly to the size of the quantum dot. For example, the larger quantum dots, such as red quantum dots, can absorb and emit photons having a relatively lower energy (i.e. a relatively longer wavelength). On the other hand, orange quantum dots, which are smaller in size can absorb and emit photons of a relatively higher energy (shorter wavelength). Additionally, daylight panels are envisioned that use cadmium-free quantum dots and rare earth (RE) doped oxide colloidal phosphor nano-particles, in order to avoid the toxicity of the cadmium in the quantum dots.

Examples of suitable quantum dots include: CdZnSeS (cadmium zinc selenium sulfide), $Cd_xZn_{1-x}Se$ (cadmium zinc selenide), $CdSe_xS_{1-x}$ (cadmium selenium sulfide), CdTe (cadmium telluride), $CdTe_xS_{1-x}$ (cadmium tellurium sulfide), InP (indium phosphide), $In_xGa_{1-x}P$ (indium gallium phosphide), InAs (indium arsenide), $CuInS_2$ (copper indium sulfide), $CuInSe_2$ (copper indium selenide), $CuInS_xSe_{2-x}$ (copper indium sulfur selenide), $CuIn_xGa_{1-x}S_2$ (copper indium gallium sulfide), $CuIn_xGa_{1-x}Se_2$ (copper indium gallium selenide), $CuIn_xAl_{1-x}Se_2$ (copper indium aluminum selenide), $CuGaS_2$ (copper gallium sulfide) and $CuInS_{2x}ZnS_{1-x}$ (copper indium selenium zinc selenide).

The quantum dots material can comprise core/shell nano-crystals containing different materials in an onion-like structure. For example, the above described exemplary materials can be used as the core materials for the core/shell nano-crystals. The optical properties of the core nano-crystals in one material can be altered by growing an epitaxial-type shell of another material. Depending on the requirements, the core/shell nano-crystals can have a single shell or multiple shells. The shell materials can be chosen based on the band gap engineering. For example, the shell materials can have a band gap larger than the core materials so that the shell of the nano-crystals can separate the surface of the optically active core from its surrounding medium. In the case of the cadmium-based quantum dots, e.g., CdSe quantum dots, the core/shell quantum dots can be synthesized using the formula of CdSe/ZnS, CdSe/CdS, CdSe/ZnSe, CdSe/CdS/ZnS, or CdSe/ZnSe/ZnS. Similarly, for $CuInS_2$ quantum dots, the core/shell nanocrystals can be synthesized using the formula of $CuInS_2$/ZnS, $CuInS_2$/CdS, $CuInS_2$/$CuGaS_2$, $CuInS_2$/$CuGaS_2$/ZnS and so on.

In embodiments where the excitation light 20 $\lambda_{ex}$ comprises blue light, the photoluminescence material can comprise a mixture of green and red light emitting phosphor materials such as a green aluminate-based or YAG-based phosphor materials and a red nitride-based phosphor material. The phosphor material which typically comprises a powdered material is thoroughly mixed with a curable (thermal or UV curable) light transmissive liquid binder material, such as a silicone or epoxy material, and the mixture deposited as a uniform layer 16b to the surface of the light reflective substrate 16a. The phosphor material mixture can be applied by various deposition methods including printing, such as screen printing, pad printing, spin coating or doctor blading (i.e. use of a flexible blade, squeegee, to draw material uniformly over the surface).

The lens 18 of the flash unit 10 is a cylindrical lens having a convex cross section (e.g., biconvex in the FIG. 1) in which the plane of the lens is located on the laser chip emission plane 22 and which is disposed between the laser chip 14 and the reflective conversion component 16. As described above the laser chip typically produces an emission characteristic that is 2 μm (vertical direction) by 20 μm (parallel direction) in size and the lens 18 is configured to direct the excitation light 20 such that when it strikes the surface of the photoluminescence material layer 16b it is substantially circular in form and has a size (diameter ø) of about 20 μm to 50 μm. In FIG. 2 the incident excitation light spot is indicated by a dotted line denoted by reference numeral 30 and has an area of between about 0.0003 mm² (ø20 μm) and about 0.002 mm² (ø50 μm). Whilst the lens 18 is indicated as being a convergent lens, depending on the emission characteristic of the laser chip 14 the lens can be divergent and may be convex or concave in form.

As indicated in FIG. 1 the flash unit 10 is located within a device such as a cell phone or tablet computer adjacent to the inner surface of the device.

Light 28 generated by the flash unit 10 is emitted through an aperture 34 of the device casing 32. Typically the aperture 34 includes a lens 36 to direct and converge the light 28 to increase the effective range of the flash unit 10. As indicated in FIG. 1 the lens 36 can comprise a convexo-concave lens. In other embodiments the lens 36 can comprise a part of the flash unit 10.

In operation the laser chip 14 generates a pulse of blue excitation light 20 for a period of about 300 ms which is directed onto the photoluminescence material layer 16b of the reflective conversion component 16. A portion of the excitation light 20 $\lambda_{ex}$ excites the phosphor material(s) within the photoluminescence material layer 16b which in response, by a process of photoluminescence, generates photoluminescence light 26 $\lambda_{ph}$ of another peak wavelength (color) typically yellow, yellow/green, orange, red or a combination thereof. The unconverted portion of blue laser generated light 20 $\lambda_{ex}$ combined with the photoluminescence light 26 $\lambda_{ph}$ gives the flash unit 10 an emission product 28 that is white in color. Whilst the excitation light spot 30 (FIG. 2) incident on the photoluminescence layer typically can have a diameter of 20 μm to 50 μm, white light (a combination of scattered blue light and photoluminescence generated light) is emitted from the photoluminescence layer 16b over a greater area that is typically about twice (200%) this size. The flash unit's effective light source size 38 is therefore circular with of diameter of about 40 μm to about 100 μm, that is an effective source area of 0.001 mm² to 0.008 mm². The larger effective source size 38 compared with the incident excitation light size 30 results from the isotropic nature of the photoluminescence and light scattering processes. As a result of the very small effective source size 38 the flash unit has a much lower (two to three orders of magnitude lower) etendue compared with a LED-based flash unit which, as described below, typically has an effective source size of about 1 mm². Due to this lower etendue and more particularly the smaller effective source size 38, this enables the lens/optic 36 to gather more of the light and direct it to increase the effective range of the flash unit 10.

Figure 3:
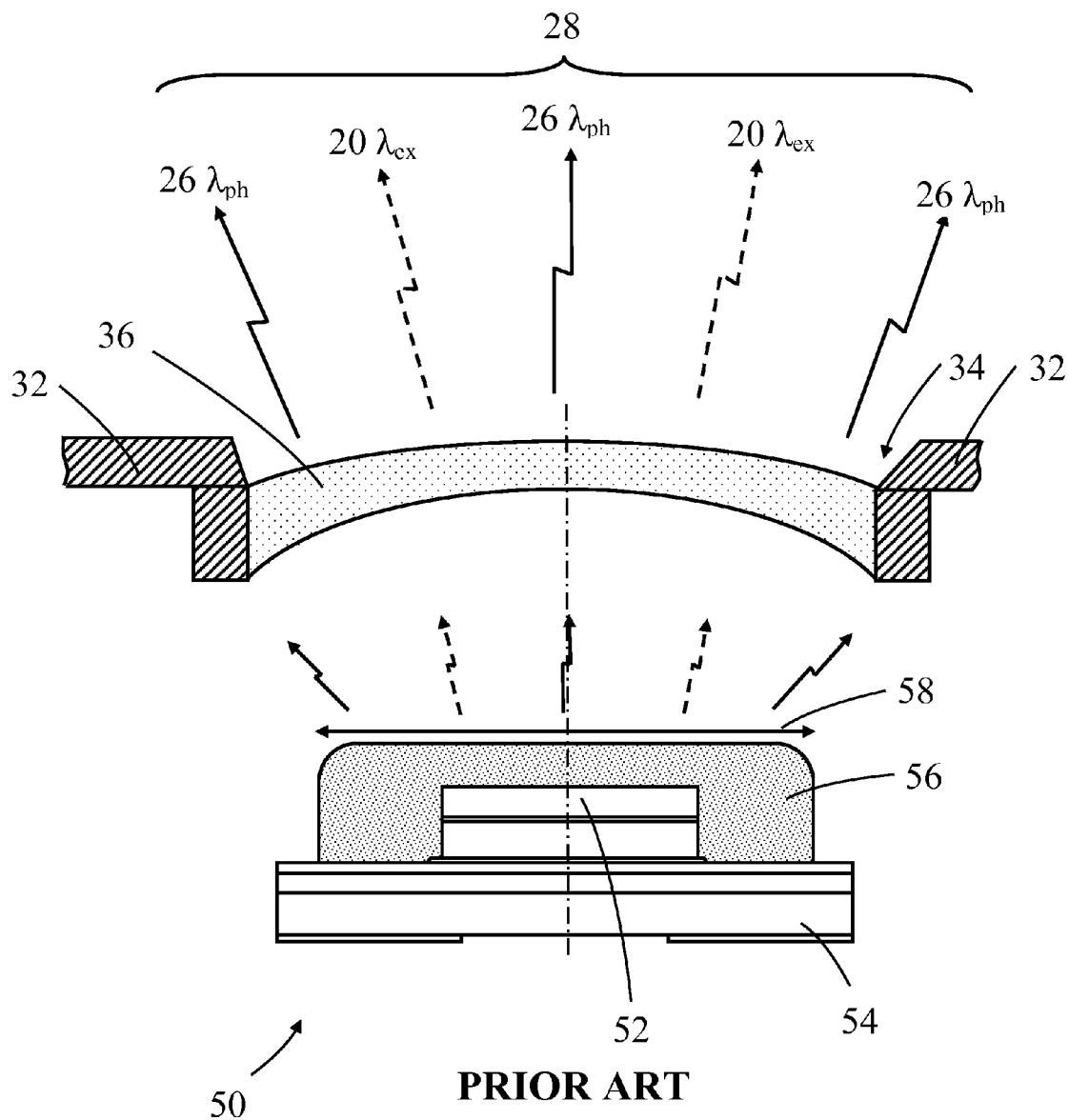
FIG. 3 is a schematic sectional side view of a known white LED-based camera flash unit.

FIG. 3 is a schematic sectional view of a known LED-based camera flash 50. The flash 50 comprises an LED chip 52 that is mounted on a thermally conductive substrate 54. The light emitting surface of the LED chip 52 is coated (encapsulated) with a photoluminescence wavelength conversion layer encapsulation 56 containing one or more phosphor materials. The LED chip 52 typically comprises a 1 to 3 Watt blue emitting GaN device which is approximately square with sides of 1 mm by 1 mm and thus an emitting surface of about 1 mm². In operation the LED chip 52 generates a pulse of blue excitation light 20 $\lambda_{ex}$ and a portion of which excites the phosphor material(s) within the photoluminescence material encapsulation 56 which in response, by a process of photoluminescence, generates photoluminescence light 26 $\lambda_{ph}$ of another wavelength (color) typically yellow, yellow/green, orange, red or a combination thereof. The unconverted portion of LED generated blue excitation light 20 $\lambda_{ex}$ combined with the photoluminescence light 26 $\lambda_{ph}$ gives the flash 50 an emission product 28 that is white in color. It will be appreciated that since light is generated over the entire surface of the photoluminescence layer 56 the effective source size 58 of the flash is at least 1 mm². As a result of the much smaller effective source size 38 of the flash unit of the present invention compared with the known white LED-based flash units makes it viable for the lens 36 to gather more of the flash light 28 and converge this to increase the effective range of the flash.

Figure 4:
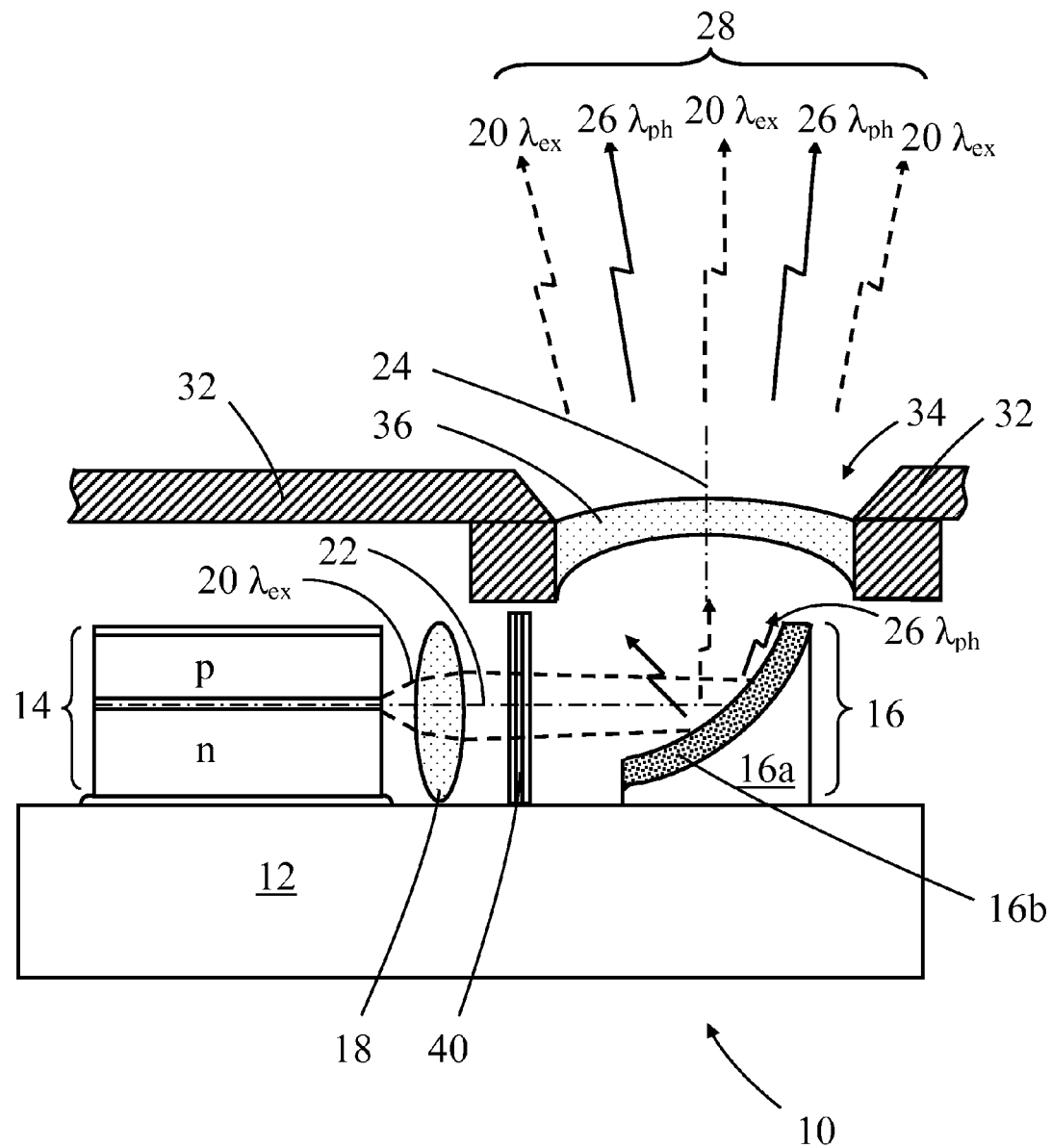
FIG. 4 is a schematic side view of a solid-state camera flash unit in accordance with an embodiment of the invention.

FIG. 4 shows a schematic side view of a solid-state camera flash unit 10 in accordance with an embodiment of the invention. The flash unit 10 is essentially the same as the flash unit of FIGS. 1 and 2, and like reference numerals are used to denote like parts. In this embodiment the photoluminescence material layer 16b is concave in form and the flash unit additionally includes a wavelength selective filter 40 disposed between the lens 18 and the reflective conversion component 16. The wavelength selective filter 40 has an optical characteristic of being substantially transmissive to light with a wavelength corresponding to the excitation light 20 $\lambda_{ex}$ and substantially reflective to light of a wavelength corresponding to the photoluminescence light 26 $\lambda_{ph}$. Since the photoluminescence process is isotropic about half of the photoluminescence light 26 $\lambda_{ph}$ will be emitted in a direction back towards the laser chip 14. The wavelength selective filter 40 is configured to prevent such photoluminescence light 26 $\lambda_{ph}$ being absorbed by the laser chip 14. The wavelength selective component can comprise a multilayer dielectric filter or dichroic filter. Other than the addition of the wavelength selective filter 40, operation of the flash unit is the same as that of flash unit of FIG. 1 and is not described further.

Figure 5:
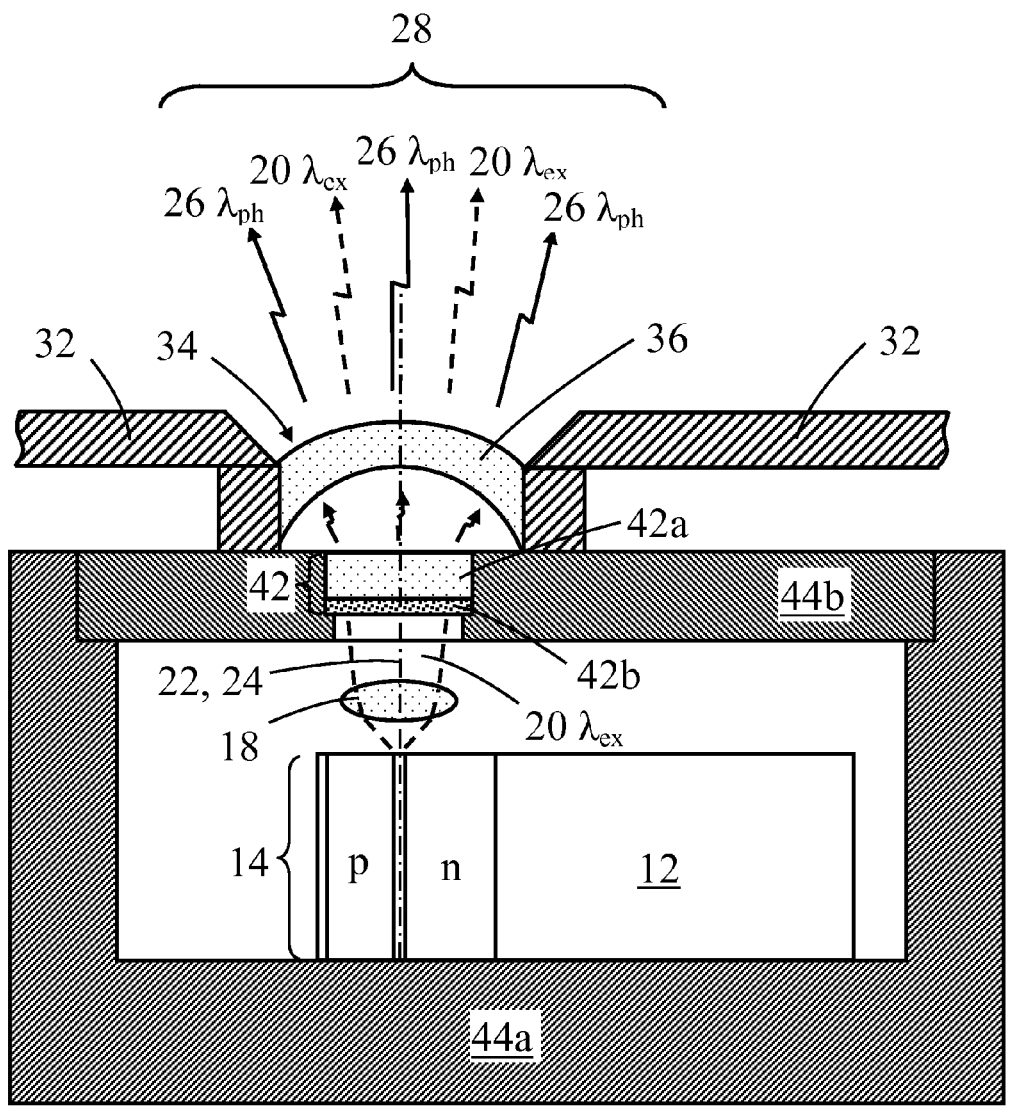
FIG. 5 is a schematic side view of a solid-state camera flash unit in accordance with an embodiment of the invention.

FIG. 5 shows a schematic side view of a solid-state camera flash unit 10 in accordance with an embodiment of the invention. Like reference numerals are used to denote like parts. In contrast to the earlier embodiments the flash unit utilizes a light transmissive photoluminescence wavelength conversion component 42 (hereinafter "transmissive conversion component") rather than a reflective conversion component. The transmissive conversion component 42 is composed of a light transmissive substrate 42a and a photoluminescence material layer 42b containing one or more photoluminescence materials typically phosphors. As indicated in FIG. 5 the transmissive conversion component 42, which constitutes the flash unit's output, is mounted in an opening in a wall 44b of a flash unit housing 44.

Typically, for ease of fabrication, the transmissive conversion component 42 is planar in form (often a circular disc) though it can be square, rectangular in shape convex or concave in form. To prevent physical damage to the photoluminescence material layer 42b and/or possible degradation of the phosphor materials from the uptake of water, the transmissive conversion component 42 is preferably configured such that photoluminescence material layer 42b is located within the interior of the flash unit housing 44.

The light transmissive substrate 42a can comprise any light transmissive material which is at least translucent and preferably has a transmittance to visible light of 50% or greater and can comprise a polymer material for example a polycarbonate, polypropylene, acrylic or silicone or a glass such as a quartz glass. To aid in the dissipation of heat generated by the photoluminescence process, the light transmissive substrate 42a can, as well as being light transmissive, additionally be a thermally conductive material. Examples of suitable light transmissive thermally conductive materials include: magnesium oxide, sapphire, aluminum oxide, quartz glass, aluminum nitride and diamond. The transmittance of the thermally conductive light transmissive substrate 42a can be increased by making the substrate thin. To increase mechanical strength, the light transmissive substrate 42a can comprise a laminated structure with the thermally conductive layer mounted on a light transmissive support such as a glass or plastics material. When using a laminated thermally conductive light transmissive substrate 42a the photoluminescence material layer 42b is deposited in direct contact with the thermally conductive substrate portion. To further aid in the dissipation of heat at least a part, typically the edge(s), of the thermally conductive substrate 42a is mounted in thermal communication with the flash unit housing 44 which can be made of a thermally conductive material.

In contrast to the embodiments of FIGS. 1, 2 and 4 the laser chip emission axis/plane 22 is parallel with the emission axis 24 of the flash unit.

In operation the laser chip 14 generates a pulse of blue excitation light 20 for a period of about 300 ms which is directed onto the photoluminescence material layer 42b of the transmissive conversion component 42. A portion of the excitation light 20 $\lambda_{ex}$ excites the phosphor material(s) within the photoluminescence material layer 42b which in response, by a process of photoluminescence, generates photoluminescence light 26 $\lambda_{ph}$ of another wavelength (color) typically yellow, yellow/green, orange, red or a combination thereof. The unconverted portion of blue laser generated light 20 ($\lambda_{ex}$) combined with the photoluminescence light 26 ($\lambda_{ph}$) gives the flash unit 10 an emission product 28 that is white in color. It will be appreciated that all light contributing to the flash unit's emission product 28 passes through the transmissive conversion component 42.

As with other embodiments a convergent lens 18 disposed between the laser chip 14 and the transmissive wavelength conversion component 42 is configured to direct the excitation light 20 such that when it strikes the surface of the photoluminescence material layer 42b it is substantially circular in form and has a diameter o of about 20 μm to 50 μm. As with a reflective conversion component 16 whilst the excitation light spot incident on the photoluminescence layer typically can have a diameter of 20 μm to 50 μm, white light (a combination of transmitted blue light and photoluminescence generated light) is emitted from the transmissive conversion component over an area that is typically about twice the incident excitation light spot size. The flash unit's effective light source size is therefore circular with of diameter of about 40 µm to about 100 µm.

Figure 6:
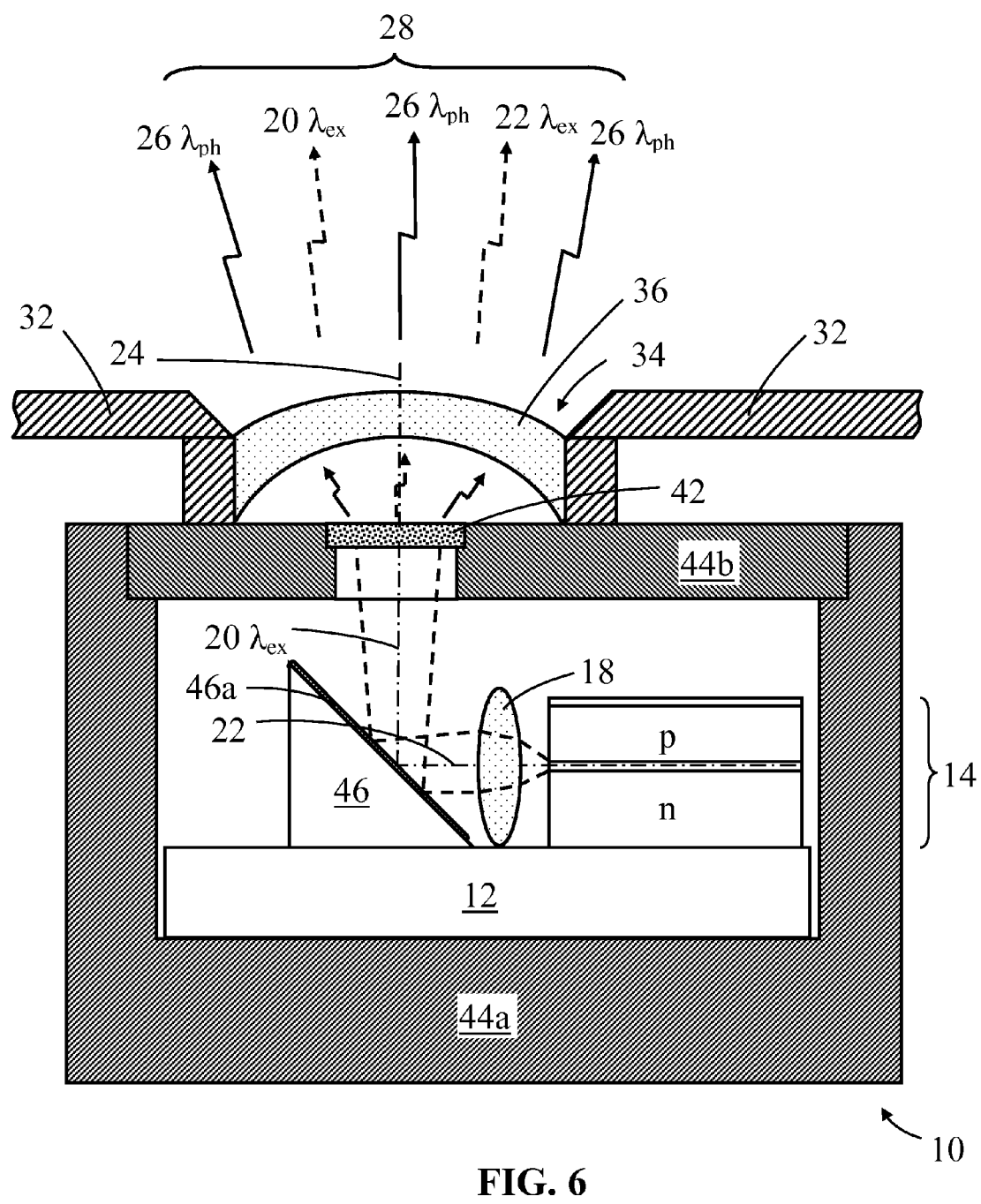
FIG. 6 is a schematic side view of a solid-state camera flash unit in accordance with an embodiment of the invention.

FIG. 6 shows a schematic side view of a solid-state camera flash unit 10 in accordance with an embodiment of the invention. The flash unit in common with that of FIG. 5 utilizes a transmissive conversion component 42 and like reference numerals are used to denote like parts. As with the embodiment of FIG. 1 the laser chip 14 is configured such that the laser chip emission axis/plane 22 is orthogonal to the emission axis 24 of the flash unit. Such a configuration can aid in minimizing the overall thickness t of the camera flash unit 10. To direct the excitation light 20 onto the transmissive conversion component 42 the flash unit 10 further comprises a reflector 46 located in the path between the laser chip and transmissive wavelength conversion component 42. The reflector 46 includes a highly light reflective surface 46a that inclined an angle of 45° to the laser chip emission axis/plane 24.

In this embodiment the phosphor material(s) are incorporated in and substantially homogeneously distributed throughout the volume of the transmissive conversion component 42. In such a configuration the transmissive conversion component 42 is can be composed of a light transmissive polymer material such as for example a polycarbonate, acrylic or silicone and can be conveniently fabricated by injection molding. Alternatively, the transmissive conversion component can comprise a low melting temperature glass in which the phosphor material(s) are incorporated. Whilst the transmissive conversion component 42 is shown as being planar in form in FIG. 6, typically a circular disc, it can comprise other forms such as being hollow and/or having a concave or convex surface(s).

Since operation of the flash unit is the same as that of flash unit of FIG. 5 it is not described further.

It will be appreciated that the flash units of the invention are not limited to the embodiments described and that modifications can be made without departing from the scope of the invention.

What is claimed is:

1. A camera flash comprising: a solid-state light source operable to emit excitation light having an emission peak wavelength in a first wavelength range and a photoluminescence wavelength conversion component located remote to the solid-state light source, said photoluminescence wavelength conversion component comprising at least one photoluminescence material that is excitable by said excitation light and in response emits light having an emission peak wavelength in a second wavelength range; wherein the solid-state light source is configured such that excitation light is incident on an area of the photoluminescence wavelength conversion component less than about 0.01 mm$^2$.

2. The camera flash of claim 1, wherein excitation light is incident on an area of the photoluminescence wavelength conversion component less than about 0.005 mm$^2$.

3. The camera flash of claim 1 or claim 2, wherein excitation light incident on the photoluminescence wavelength conversion component is substantially circular in form of a diameter between about 20 µm and about 50 µm.

4. The camera flash of claim 1, wherein the solid-state light source comprises a laser chip.

5. The camera flash of claim 1, wherein the photoluminescence wavelength conversion component comprises a light reflective substrate and wherein the at least one photoluminescence material comprises at least one layer on a light reflective surface of the light reflective substrate.

6. The camera flash of claim 5, wherein the light reflective substrate is thermally conductive.

7. The camera flash of claim 5, wherein the light reflective substrate is selected from the group consisting of: aluminum oxide, aluminum nitride, aluminum and copper.

8. The camera flash of claim 1, wherein the photoluminescence wavelength conversion component comprises a light transmissive substrate and wherein the at least one photoluminescence material comprises at least one layer on a surface of the light transmissive substrate.

9. The camera flash of claim 8, wherein the light transmissive substrate is thermally conductive.

10. The camera flash of claim 9, wherein the light transmissive substrate is selected from the group consisting of: magnesium oxide, sapphire, aluminum oxide, quartz glass, aluminum nitride and diamond.

11. The camera flash of claim 1, wherein the photoluminescence wavelength conversion component comprises a light transmissive substrate and wherein the at least one photoluminescence material is incorporated in, and is substantially homogeneously distributed within, the light transmissive substrate.

12. The camera flash of claim 1, further comprising a thermally conductive substrate, wherein the solid-state light source is mounted in thermal communication with the thermally conductive substrate, and wherein the thermally conductive substrate is selected from the group consisting of: aluminum oxide, aluminum nitride and aluminum.

13. The camera flash of claim 1, further comprising a lens disposed between the solid-state light source and the photoluminescence wavelength conversion component, the lens being configured to direct excitation light on an area of the photoluminescence wavelength conversion component less than about 0.01 mm$^2$.

14. The camera flash of claim 1, further comprising a wavelength selective component disposed between the solid-state light source and the photoluminescence wavelength conversion component, said wavelength selective component having an optical property of being substantially transmissive to the excitation light and being substantially reflective to light generated by the at least one photoluminescence material.

15. The camera flash of claim 1, wherein the solid-state light source is operable to generate blue excitation light having an emission peak wavelength in a range 465 nm to 480 nm.

16. The camera flash of claim 15, wherein an emission product of the camera flash comprises a combination of light generated by the at least one photoluminescence material and unconverted excitation light.

17. The camera flash of claim 1, wherein the solid-state light source is operable to generate ultra violet excitation light having an emission peak wavelength in a range 365 nm to 400 nm.

18. The camera flash of claim 17, wherein the photoluminescence wavelength conversion component comprises at least two photoluminescence materials and wherein an emission product of the camera flash comprises a combination of light generated by the at least two photoluminescence materials.

19. The camera flash of claim 1, wherein the solid-state light source is operable to emit light for a duration of up to about 300 ms.

20. The camera flash of claim 1, wherein an emission product comprises white light with a color temperature of 4,500K to 5,000K.

21. The camera flash of claim 1, wherein an emission product has a color rendering index of a range from 90 to 100.

* * * * *